United States Patent [19]
Kuslak

[11] Patent Number: 5,911,083
[45] Date of Patent: Jun. 8, 1999

[54] PROGRAMMABLE PROCESSOR EXECUTION RATE CONTROLLER

[75] Inventor: John Steven Kuslak, Blaine, Minn.

[73] Assignee: Unisys Corporation, Blue Bell, Pa.

[21] Appl. No.: 08/777,214

[22] Filed: Dec. 27, 1996

[51] Int. Cl.[6] .................................................. G06F 5/06
[52] U.S. Cl. ..................... 395/800.41; 395/561; 395/558
[58] Field of Search ..................... 395/393, 556, 395/581, 674, 800.41, 800.4, 561, 558; 711/219, 122

[56] References Cited

U.S. PATENT DOCUMENTS

| | | | |
|---|---|---|---|
| 4,750,112 | 6/1988 | Jones et al. | 395/393 |
| 4,809,169 | 2/1989 | Sfarti et al. | 395/800.2 |
| 4,819,164 | 4/1989 | Branson | 395/556 |
| 4,947,411 | 8/1990 | Shiraishi et al. | 377/47 |
| 5,041,962 | 8/1991 | Lundsford et al. | 395/287 |
| 5,363,490 | 11/1994 | Alferness et al. | 395/581 |
| 5,367,699 | 11/1994 | Lange et al. | 711/219 |
| 5,392,444 | 2/1995 | Inoue | 395/674 |
| 5,577,259 | 11/1996 | Alferness et al. | 395/800.41 |
| 5,617,576 | 4/1997 | Solari et al. | 395/800.4 |
| 5,680,571 | 10/1997 | Bauman | 711/122 |

*Primary Examiner*—Parshotam S. Lall
*Assistant Examiner*—Bau Trong Le
*Attorney, Agent, or Firm*—Beth L. McMahon; Charles A. Johnson; Mark T. Starr

[57] ABSTRACT

A system and method for controlling the execution rate of an instruction processor on an instruction-by-instruction basis in a data processing system. The user controls the execution rate by specifying "cycle-slip" data for each instruction type in the instruction set. This cycle-slip data is used to force the instruction processor to idle for the specified number of execution cycles during the execution of the associated instruction type, thereby slowing down the rate of execution. Allowing rate control data to be unique for each instruction type allows temporary fixes to be implemented when timing-related hardware problems are discovered during system test. If desired, a uniform number of cycle slips can be imposed on all instructions so that the overall rate of the instruction processor is tailored to match the execution rate of slower peripheral devices.

21 Claims, 13 Drawing Sheets

PROGRAMMABLE PROCESSOR EXECUTION RATE CONTROLLER

BACKGROUND OF THE INVENTION

1. Field of the Invention

This invention relates to controlling the instruction processing rate of a digital data processing system; and, more particularly, to regulating the processing rate on an instruction-by-instruction basis during the execution of a computer program.

2. Description of the Prior Art

In digital processing systems, it is often desirable to control the execution rate of an instruction processor (IP). Controlling the processing rate may be useful for several reasons. First, slowing the execution rate may provide a temporary solution to hardware problems discovered during system test. This is because many hardware problems uncovered during full-speed system test do not manifest themselves when the IP is executing at a slower rate. Slowing the execution rate can therefore provide a temporary solution until a permanent design fix can be implemented.

Slowing the execution rate can be particularly effective for implementing temporary fixes in pipelined IPs. In pipelined IP architectures, several instructions are resident within the IP at the same time in various stages of execution. For example, the IP hardware may be simultaneously executing the hardware sequences associated with the Nth instruction, fetching an operand in preparation for execution of the Nth+1 instruction, and performing the initial decode for the Nth+2 instruction. This is referred to as having multiple instructions "in the IP pipeline". Pipelined architecture increases system throughput by allowing multiple instructions to be executing at the same time.

Often during system test, design problems are uncovered because the hardware sequences associated with two pipelined instructions result in unforeseen interaction. For example, the hardware sequences associated with the decode of a particular Nth+2 instruction may interfere in an unforeseen manner with the operand fetch of the Nth+1 instruction. Often such problems will not be manifested if the IP throughput is slowed down so that the Nth+1 Instruction is completely executed before the Nth+2 instruction is read into the IP pipeline. This is called "de-piping" the IP. Controlling the IP execution so that an IP can be de-piped is a useful means of implementing temporary "work-arounds" during hardware test until permanent design fixes are available.

The ability to vary an IP's execution rate can have useful applications in addition to those associated hardware test. For example, the ability to vary an IP's execution rate can allow a single processor design to be used within several different computing systems. Today, digital processing systems can range from very large high-speed mainframe systems to small desk-top models. A high-speed system having a large high-speed memory and a large bandwidth memory interface is generally designed to interface with a high-speed processor. The smaller midrange or desktop computing system, which may have a smaller, slower memory, and which may interface to slow peripheral devices, may require a slower IP. By using an IP with a variable execution rate, the same IP design can be integrated within both the high-speed systems and the slower machines. This spreads IP development costs over several products. It also lowers the cost of any custom-made silicon devices used in the IP design by increasing the production volume of such chips.

In prior art digital processing systems, several methods are typically used to vary a system's execution rate. One method used to adapt fast IP designs to slower machines involves slowing down IP execution using interrupts generated by the operating system. An interrupt is sent from the operating system to the IP after the execution of every instruction. The associated interrupt handler does nothing but "waste" IP time, thereby throttling the IP execution rate. This method can be useful, for example, in matching an IP request rate to a slower memory device.

This method has several disadvantages. First, it is not transparent to the hardware used for system time calculations. Generally, multi-user systems have a system timer which is used for billing purposes. This system timer records the amount of processing time used by each user. Users are only billed for the processing time spent doing productive work, not the time "wasted" in the slow-down interrupt handlers. However, the system timer, which is generally clocked by the system clock, can not distinguish between productive and "wasted" time. Therefore, billing records must be adjusted manually to take into consideration the slow-down mechanism.

In addition, using the operating system to implement slow-downs does not slow instruction execution at the hardware level. This method is therefore not effective to de-pipe an instruction processor so that temporary hardware work-arounds can be implemented during test.

Another method of controlling the execution rate of an IP can be used to implement hardware work-arounds. This method involves controlling the IP microcode sequencer. Most IP hardware designs have microcode sequencer logic which contains memory devices and associated control logic. The memory devices contain the digital data needed to initiate and control the hardware sequences for each IP instruction. Embedding a no-operation, or "NOP", instruction within the IP microcode causes the IP to pause and do nothing for a clock cycle, thereby effectively slowing the processing rate.

This method has advantages over using operating software to control the processing rate. First, by inserting NOPs within the IP microcode for a specific instruction, delay is actually inserted during the early decode stages of that instruction. This delay allows all prior instruction within the IP pipeline to complete execution so that the IP is de-piped before the specific instruction is decoded within the pipeline. As discussed above, de-piping the machine can often provide hardware work-arounds for problems discovered during test until more permanent fixes can be implemented. This method can therefore provide hardware work-arounds on an instruction-by-instruction basis. Second, since the processor rate is being slowed at the hardware level, instead of in software, the slow-down is completely transparent to users, and any software (including the operating system) developed for the IP.

Slowing the processing rate by altering IP microcode has several drawbacks, however. It is common that often the IP microcode RAM has only a limited amount of space. Spare memory locations may not be available to insert delays where needed. In addition, some IP microcode is included in ROM. Since the ROM is not modifiable, NOP instructions can not be added to this code.

Still another method of varying processing speed involves using a programmable clock generation circuit as disclosed in Branson, U.S. Pat. No. 4,819,164. This clock generation circuit interfaces to a processor, and can be programmed by the processor to produce a system clock of a desired frequency. Changing the clock frequency therefore requires the processor to write a control register in the clock generation circuit.

The circuit disclosed by Branson is not a practical means of varying execution rate on an instruction-by-instruction basis during system test. Since each frequency change requires a processor access to the clock generation circuit, instruction sequences can not be tested on a real-time basis. The delay imposed by the frequency changes can not be controlled on a clock-cycle basis, and may mask other timing problems that would otherwise be uncovered.

U.S. Pat. No. 4,947,411 to Shiraishi et al. discloses still another method of controlling processor execution rates. In the disclosed method, a variable frequency divider supplies the clock signal to the processor. One or more processor address bits interface with the frequency divider to control the frequency-dividing factor. The processor execution rate therefore varies depending on where the processor is executing within its own address space.

Although the method disclosed by Shiraishi et al. can be used to slow the clock to the processor, it is not useful in slowing execution of an instruction once the instruction is read into the IP. In other words, it can not be used to de-pipe the machine. Furthermore, this method is not very flexible, since segments of memory are "hardcoded" to certain execution rates. As with the Branson invention discussed above, this method does not allow Execution rates to vary on an instruction-by-instruction basis depending on the specific instruction being executed.

OBJECTS

It is the primary object of the invention to provide an improved system for controlling the execution rate of an instruction processor.

It is a further object of the invention to provide a system for controlling the execution rate of an instruction processor on an instruction-by-instruction basis.

It is a still further object of the invention to provide a programmable system for controlling the execution rate of an instruction processor.

It is another object of the invention to provide a system for controlling the execution rate of a pipelined instruction processor which can be used to de-pipe the instruction processor during hardware test.

It is a further object of the invention to provide a programmable system for varying the execution rate of an instruction processor so that hardware workarounds can be implemented to temporarily fix timing problems uncovered during design test.

It is yet another object of the invention to provide a system for controlling the execution rate of an instruction processor when the instruction processor includes a ROM-based microsequencer.

It is another object of the invention to provide a system which can vary the execution rate of an instruction processor in increments of one clock cycle, where a clock cycle refers to the minimum amount of time it takes to perform a single load from memory.

It is still another object of the invention to provide a system for controlling the execution rate of an instruction processor so that the same processor design can be used in both high-speed and slower digital processing systems.

It is a further object of the invention to provide a system for varying the execution rate of an instruction processor so that the variances are transparent to the code which executes on the instruction processor.

It is yet a further object of the invention to provide a system for controlling the execution rate of an instruction processor which is transparent to the system quantum timer.

It is another object of the invention to provide a system for controlling the execution rate of an instruction processor which imposes no system overhead when the instruction processor is running at the maximum clock speed. Other more detailed objectives will become apparent from a consideration of the Drawings and the Detailed Description of the Preferred Embodiment.

SUMMARY OF THE INVENTION

The programmable execution rate controller provides an improved means of varying the execution rate of an instruction processor (IP). By changing a programmable cycle-slip count associated with each IP instruction, between zero and 31 extra clock cycles can be added to the normal execution time of any given instruction type. The added clock cycles are injected after the instruction is resident in the IP but before decode is complete. This delay effectively de-pipes a pipeline-architecture processor. The controller therefore provides a very useful debug tool, because many problems encountered during system test involve timing problems, and/or unforeseen interactions between hardware sequences associated with the IP pipeline.

Since the programmable cycle-slip count used to insert clock cycles is instruction-specific, this controller can control the IP execution rate on an instruction-by-instruction basis. During system test, instructions associated with known hardware problems can be slowed by injecting a selected number of clock cycles needed to provide a workaround for the specific problem. All other testing can occur at full clock speeds.

The programmable cycle-slip count needed to vary the IP execution rate is supplied by the system support controller, which is the processor used to initialize the system, and perform system recovery operations. Since the IP, itself, is not used to program the execution rate controller, the rate variations are completely transparent to any software running on the IP. In addition, since the support controller programs the rate controller, IP test results, are not affected by any additional overhead.

The programmable execution rate controller has another important advantage over some prior art systems. The programmable data used to vary the IP execution rate is not stored in the same memory device used by the IP microcode sequencer. This allows the IP microcode memory device to be implemented in ROM instead of RAM. This is important for several reasons. First, ROM uses less silicon area so that more logic circuits can be placed on a single custom chip. Second, ROM uses less power than does RAM. Finally, ROM is easier to manufacture, resulting in higher chip yields and lower production costs.

The programmable execution rate controller can be used to adapt the same IP design to both high-speed and slower machines. As discussed above, since the programmable rate controller is embedded in the IP hardware, it is completely transparent to software executing on the IP. Moreover, the programmable controller of the current invention is designed to be invisible to the system timer so that billing data for a multi-user system is always accurate.

The current invention operates in conjunction with IP decode hardware. At the same time as a new instruction is clocked into the IP to be decoded, a corresponding cycle-slip count is provided to the execution rate controller. If this cycle-slip count is zero, the execution rate controller has no effect and the IP execution rate continues at full-speed. If this cycle-slip count is non-zero, however, the execution rate controller provides an inhibit to all IP logic sections including the instruction tag, operand tag, arithmetic, an interrupt logic sections. When the IP decode logic attempts to initiate the hardware sequences associated with the instruction being decoded, the sequences are blocked by the inhibit signal. The inhibit signal prevents another instruction to be clocked into the IP, and further prevents incrementation of the system timer so that billing data is not affected by any IP slow-downs.

The execution rate controller is time-sensitive to the system clock so that the inhibit signal remains active for a predetermined number of clock cycles as determined by the cycle-slip count, where one clock cycle is defined as the minimum amount of time required to perform a load from memory. This active inhibit signal blocks execution for the predetermined number of clock cycles. After the predetermined number of clock cycles has elapsed, the instruction sequences are allowed to begin so that instruction execution can continue.

The programmable cycle-slip count is instruction-specific. The length of the inhibit signal can be controlled in increments of one system clock cycle for each instruction. Thus, some instructions can be executed at full speed, whereas others can be delayed the requisite number of clock cycles as dictated by each specific hardware workaround. A uniform delay can be imposed on all instructions to scale the IP execution rate so that the same IP design can be matched to a slower memory and/or peripheral devices.

DETAILED DESCRIPTION OF THE PREFERRED EMBODIMENT

A. System Environment

Figure 1:
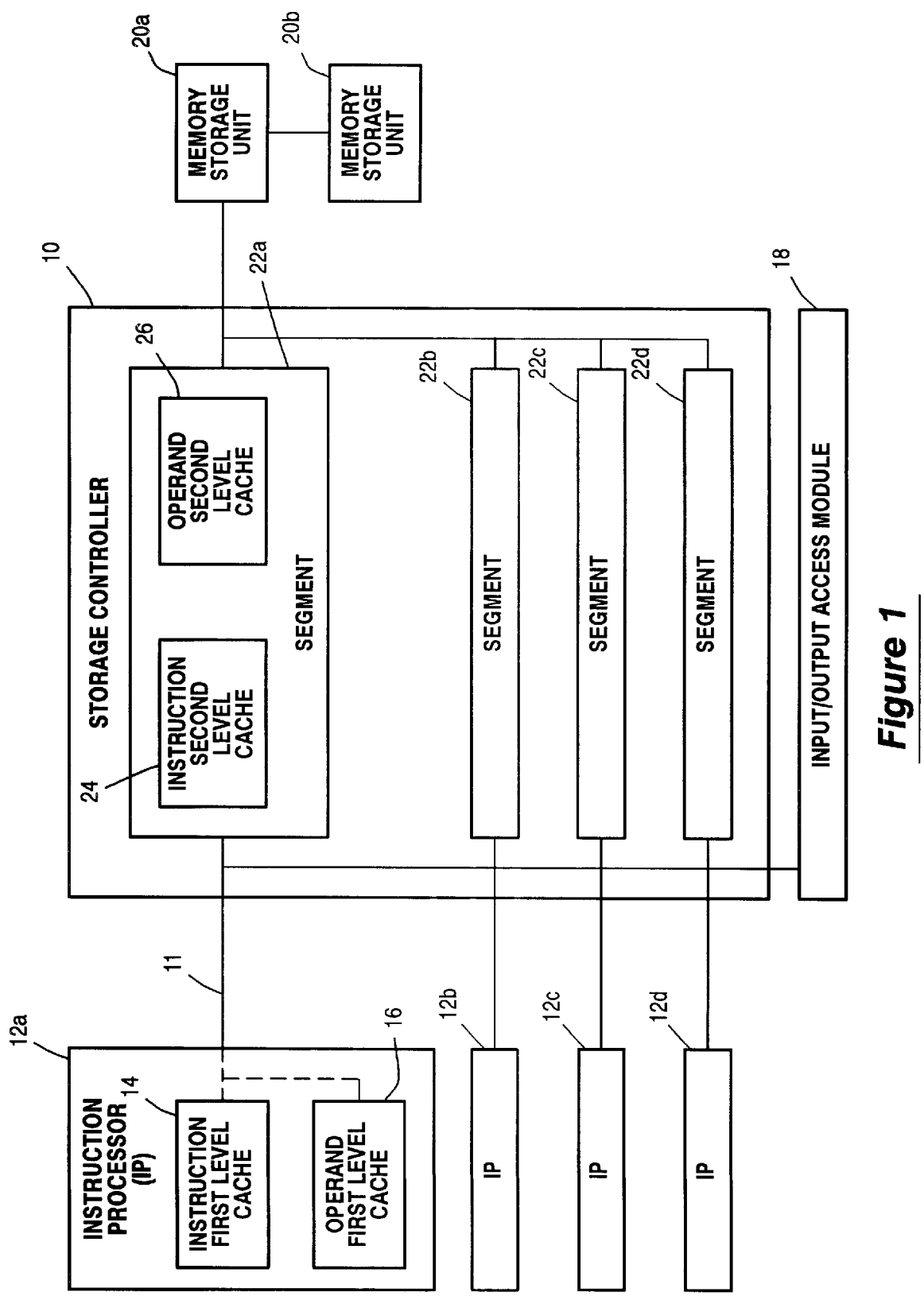
FIG. 1 is a block diagram of a data processing system utilizing the present invention.

FIG. 1 is a block diagram of a data processing system utilizing the present invention. The digital data processing system in which the invention can be utilized is modular, and provides for parallel processing of machine instructions. The system utilizes a Storage Controller (SC) 10 with each SC being directly connected via interface 11 to between one and four local Instruction Processors (IPs) illustratively shown as 12a, 12b, 12c, and 12d. Each IP has a first-level instruction cache (I-FLC) 14, and a first-level operand cache (O-FLC) 16. The IPs 12a, 12b, 12c, and 12d are the instruction execution units of the system, and provide basic mode and extended mode instruction execution. Each IP fetches instructions from memory, executes the instructions, and stores the results back into memory. The specific operation of the IPs will be described in more detail below.

The SC is further connected to an Input/Output (IO) Access Module, 18, which provides the system interface to input/output channels which support peripheral equipment (not shown.) Finally, the SC is connected to one or two local Main Storage Units (MSUs) illustratively shown as 20a and 20b, which contain the system main memory. The SC 10 has either two or four cache memory segments shown as 22a, 22b, 22c, and 22d. Each cache memory segment has a second-level instruction cache (I-SLC) 24 and a second-level operand cache (O-SLC) 26.

Figure 2:
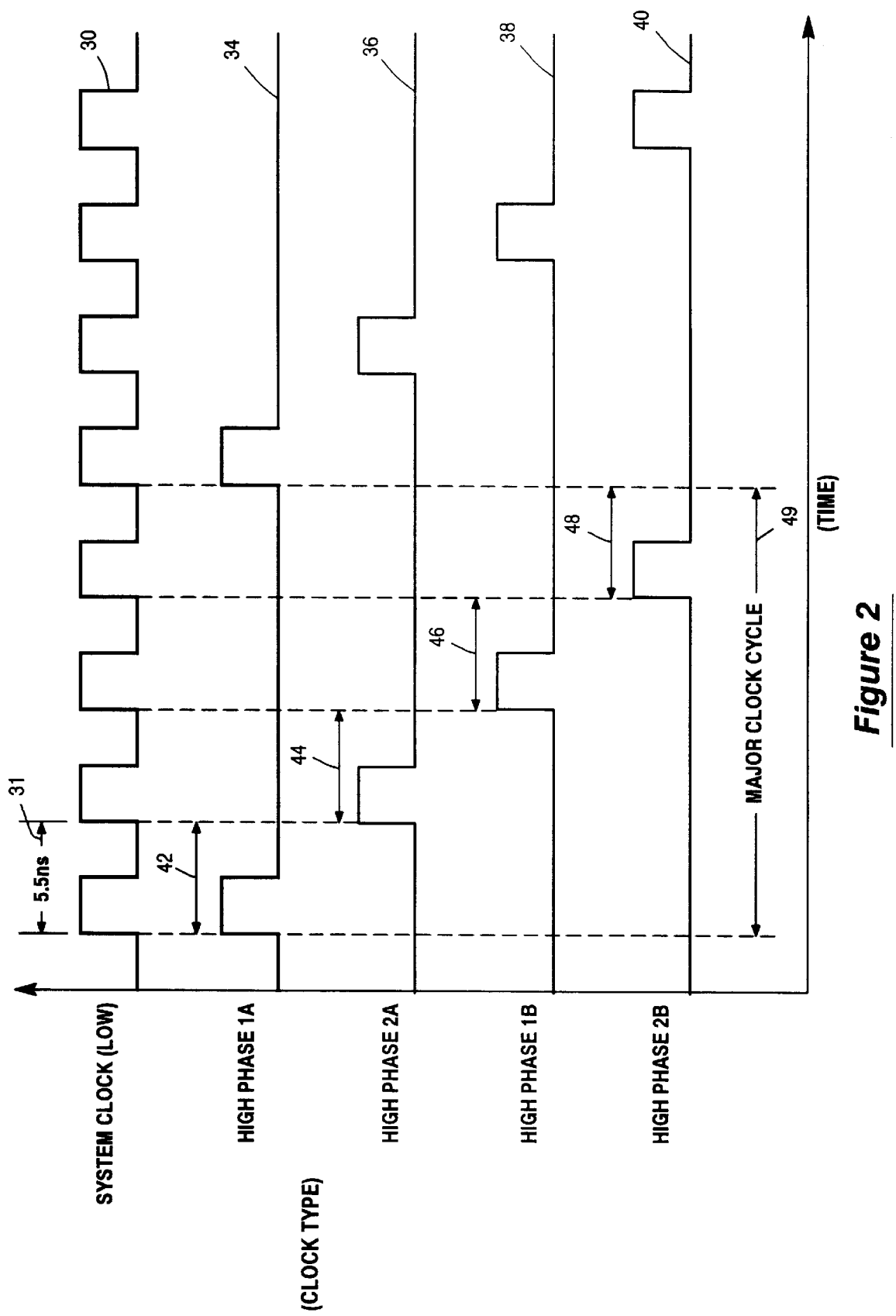
FIG. 2 is a timing diagram illustrating the clock signals associated with the IP logic.

FIG. 2 is a timing diagram illustrating the clock signals associated with the IP logic. The system clock 30, which has a period 31 of about 5.5 nanoseconds (ns), is used to generate all other clock signals in the system using a clock-generation scheme which is well-known to those skilled in the art. Four of the clock signals used within the IP logic are labeled High Phase 1A, 34, High Phase 2A, 36, High Phase 1B, 38, and High Phase 2B, 40. The system clock periods associated with the high clock pulse of High Phase 1A, High Phase 2A, High Phase 1B and High Phase 2 can be referred to as Phase 1A, 42, Phase 2A, 44, Phase 1B, 46, and Phase 2B, 48, respectively. The time between two rising edges of the High Phase 1A clock signal 34 is called a major clock cycle 49, which is about 22 ns long.

As mentioned previously, the current invention can be used in an IP which uses pipelined instruction execution. Pipelining of instruction execution is a method of increasing system throughput. The execution of each instruction is divided into functional operations which can be performed within different areas of the IP. Since each functional area of the IP can be processing somewhat independently from the other functional areas, the IP can be executing portions of several instructions at one time so that instruction execution is overlapped.

In the preferred embodiment, the data processing system utilizing the present invention divides a standard instruction into three functional operations. Each operation requires one major clock cycle 49, also called a "stage", to execute. During the first stage, the machine instruction is decoded and the addresses of any needed operands are generated. In the second stage, any needed operands are fetched from memory. During the third stage, the operation defined by the instruction is performed and the results are stored in memory. When the IP is operating in full pipelined mode, one instruction completes execution every major clock cycle 49.

Figure 3:
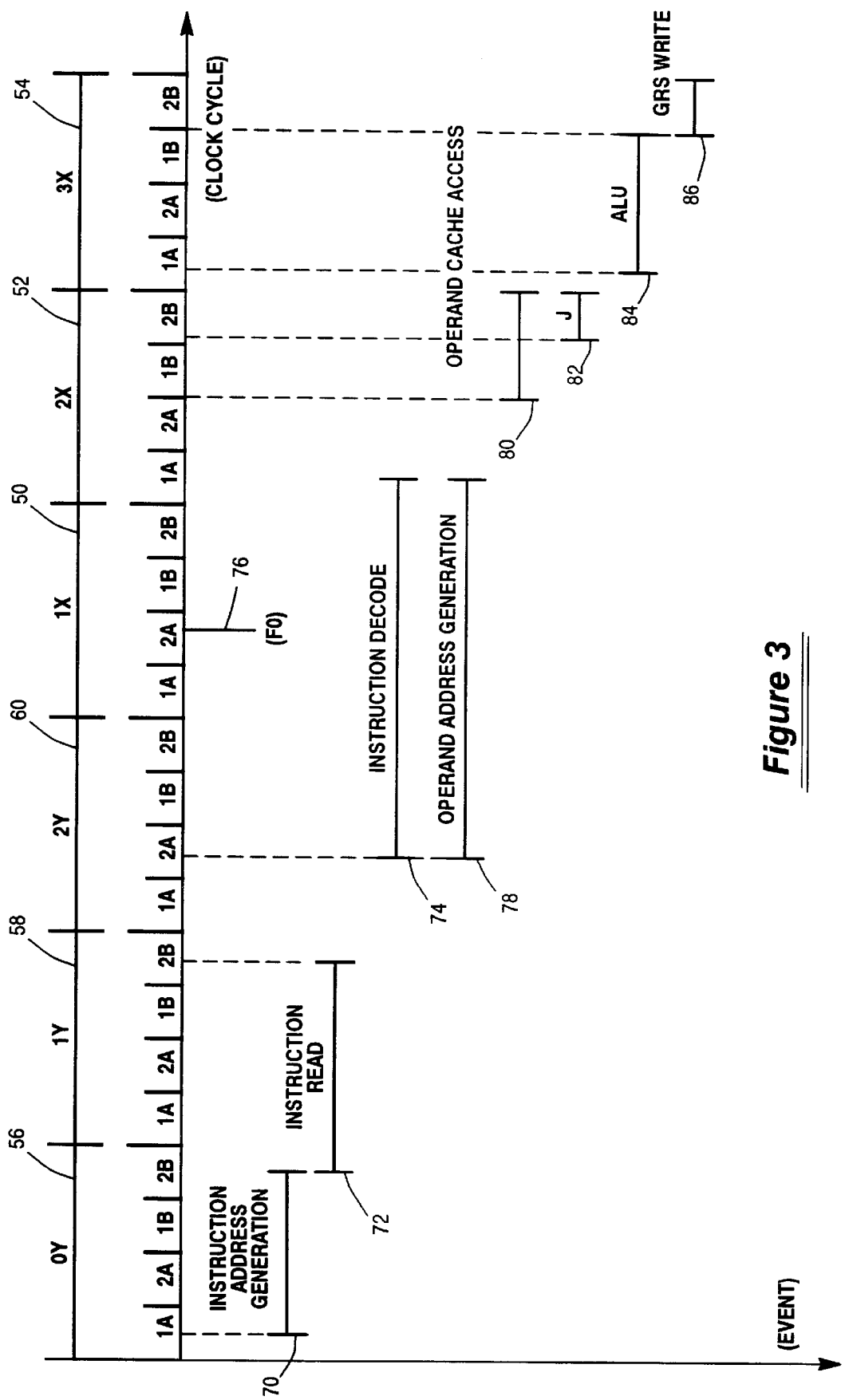
FIG. 3 is a timing sequence diagram illustrating the sequencing of a standard instruction through the instruction pipeline.

FIG. 3 is a timing sequence diagram illustrating the sequencing of a standard instruction through the instruction pipeline. The three execution stages described above are labeled 1X, 50, 2X, 52, and 3X, 54. Prior to instruction execution, three additional major cycles are required to perform address generation, read the instruction from memory, and begin instruction decode. These instruction fetch stages are labeled 0Y, 56, 1Y, 58, and 2Y, 60.

FIG. 3 shows the movement of a standard instruction through the pipeline. During stages 0Y 56 and 1Y 58, instruction address generation occurs, as indicated by line 70. During phase 2A of stage 1Y 58 the instruction address is presented to the instruction caches. Eight instructions are then read from cache during the letter half of stage 1Y, as shown by line 72. The cache hit lines are valid at the phase 1Y1B, indicating whether a cache hit occurred. If the instruction was not available within the first-level cache 14, the IP suspends operation and initiates an instruction fetch to the second-level instruction cache 24. If the instruction was available within the first-level cache 14, however, the hit lines select one of the eight instructions for execution. The selected instruction is latched at 2Y2A, and decode begins, as shown by line 74.

The instruction register, F0, is loaded during the 1X2A phase at time 76. Operand address generation 78 also occurs during the 1X stage 50. During the 2X stage 52, the operand and the General Register Set (GRS) data are fetched, as shown by line 80. Late in the 2X stage 52, Per J shifting 82, (or "J") is done to determine whether tile entire operand has been fetched. In the 3X stage 54, the Arithmetic Logic Unit (ALU) receives the operand and GRS data for processing, as shown by line 84. Finally, late in the 3X stage 54, results are written to GRS, as illustrated by line 86. For more details on instruction decode in a pipelined data processing system, see U.S. Pat. No. 5,577,259 issued on Nov. 19, 1996, entitled "Instruction Processor Control System Using Separate Hardware and Microcode Control Signals to Control the Pipelined Execution of Multiple Classes of Machine Instructions", assigned to the assignee of the present invention and incorporated herein by reference.

Figure 4:
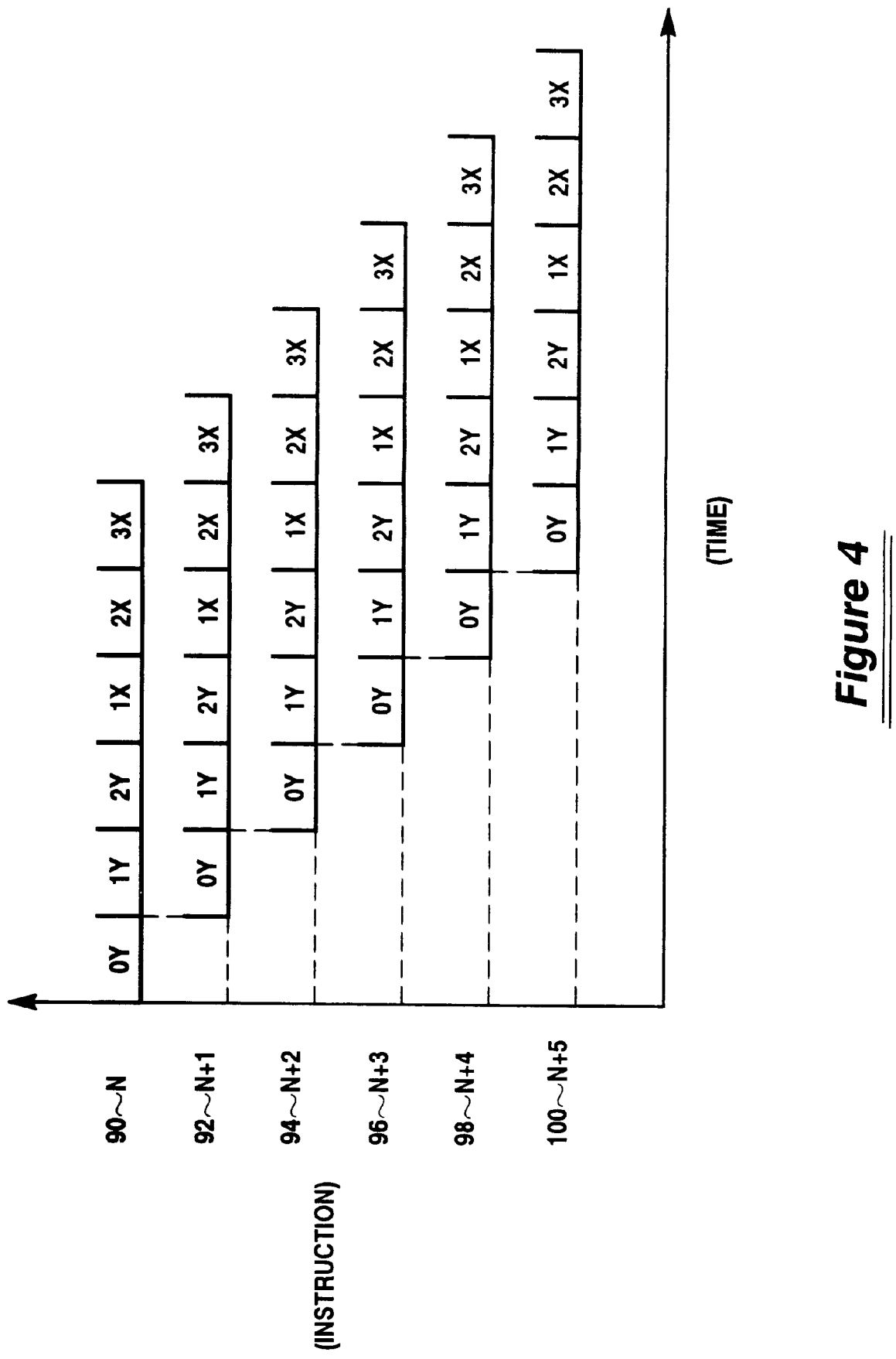
FIG. 4 is a timing diagram illustrating the pipeline instruction overlap of six consecutive standard instructions, N through N+5.

FIG. 4 is a timing diagram illustrating the pipeline instruction overlap of six consecutive standard instructions, N through N+5, labeled 90, 92, 94, 96, 98 and 100 respectively. The diagram represents fully overlapped execution for the three stages of instruction fetch 0Y, 1Y, and 2Y, and the three stages of instruction execution 1X, 2X, and 3X. As stated above, during fully overlapped operation, one instruction completes every major cycle, or about 22.2ns.

The above-described instruction execution cycles, 1X, 2X, and 3X, represent the major cycles during which standard instructions can be executed. Other non-standard, or extended-cycle, instructions require more than three execution cycles to complete. For these extended-cycle instructions, instruction pipelining is suspended by delaying the load of the next instruction into the instruction register, F0. This delay is facilitated by the activation of the "select CS control" signal, as will be described below.

Figure 5:
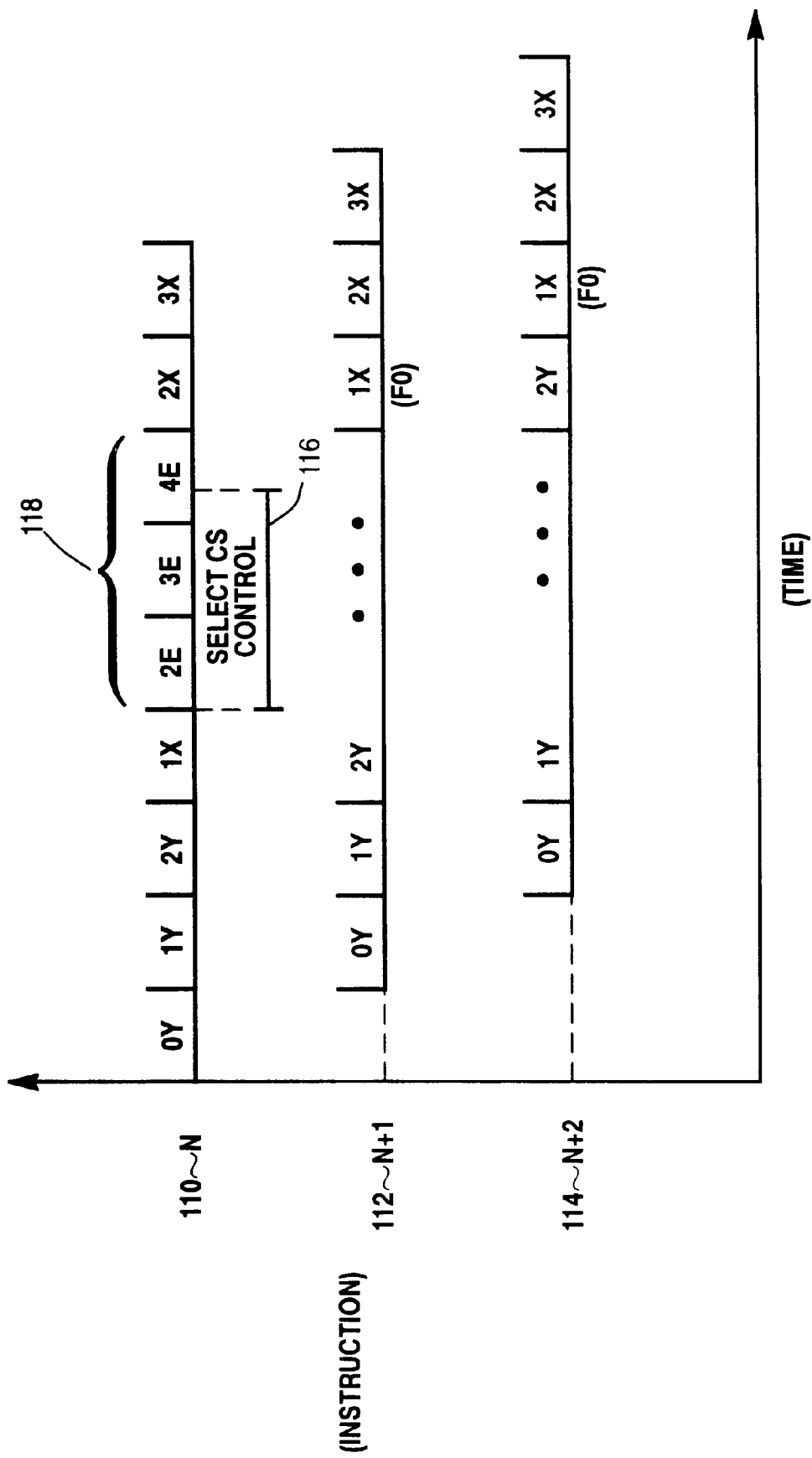
FIG. 5 is a timing diagram illustrating the suspension of the instruction execution pipeline when an extended-cycle instruction is executed.

FIG. 5 is a timing diagram illustrating the suspension of the instruction execution pipeline when an extended-cycle instruction is executed. Three consecutive instructions N 110, N+1 112, and N+2 114 are shown. Instruction N 110 is the extended-cycle instruction. The select CS control signal activates during phase 2A of stage 1X, as indicated by line 116. The activation of select CS control prevents instruction N+1 112 from being loaded into the instruction register, thereby allowing execution to continue on the Nth instruction for a variable number of additional cycles 118. These additional cycles are illustratively shown as 2E, 3E, and 4E, but more extended cycles could occur.

The select CS control signal remains active until the 1B phase prior to the beginning of the next-to-last (2X) pipeline stage, as shown by line 116. After the select CS control signal deactivates, the next instruction N+1 112 can be loaded into the instruction register F0 and normal pipeline execution is resumed.

During execution of extended-cycle instructions, instruction execution is divided into tasks which are overlapped in the same manner as during standard instruction execution. During extended-cycle instruction execution, however, the overlapped tasks are controlled by microcode bits from a microcode memory, instead of being controlled by bits generated by the hardware decode. Each stage during extended-cycle execution (2E, 3E, . . . NE), a new microinstruction is read from microcode memory to control a task associated with the extended-cycle instruction.

Figure 6:
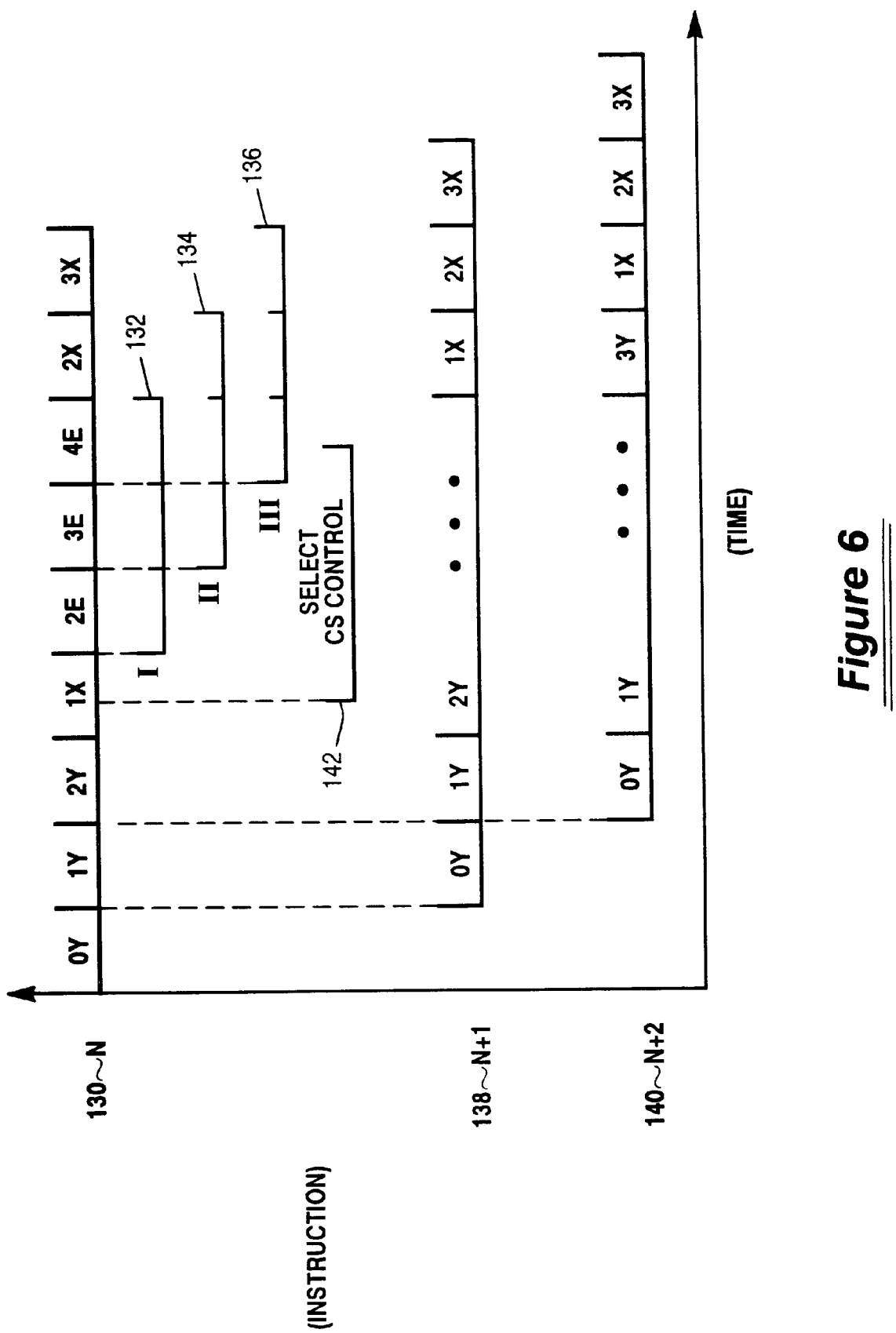
FIG. 6 is a timing diagram illustrating the overlapped execution of microinstructions.

FIG. 6 is a timing diagram illustrating the overlapped execution of microinstructions. Instruction N 130 is broken into overlapped tasks I 132, II 134, and III 136, which are controlled by associated microinstructions. During microinstruction control, execution of the subsequent instructions N+1 138 and N+2 140 is suspended. The pipelining of machine instructions is resumed at the beginning of the 2X stage of instruction N 130 after the select CS control deactivates as shown by line 142.

Figure 7:
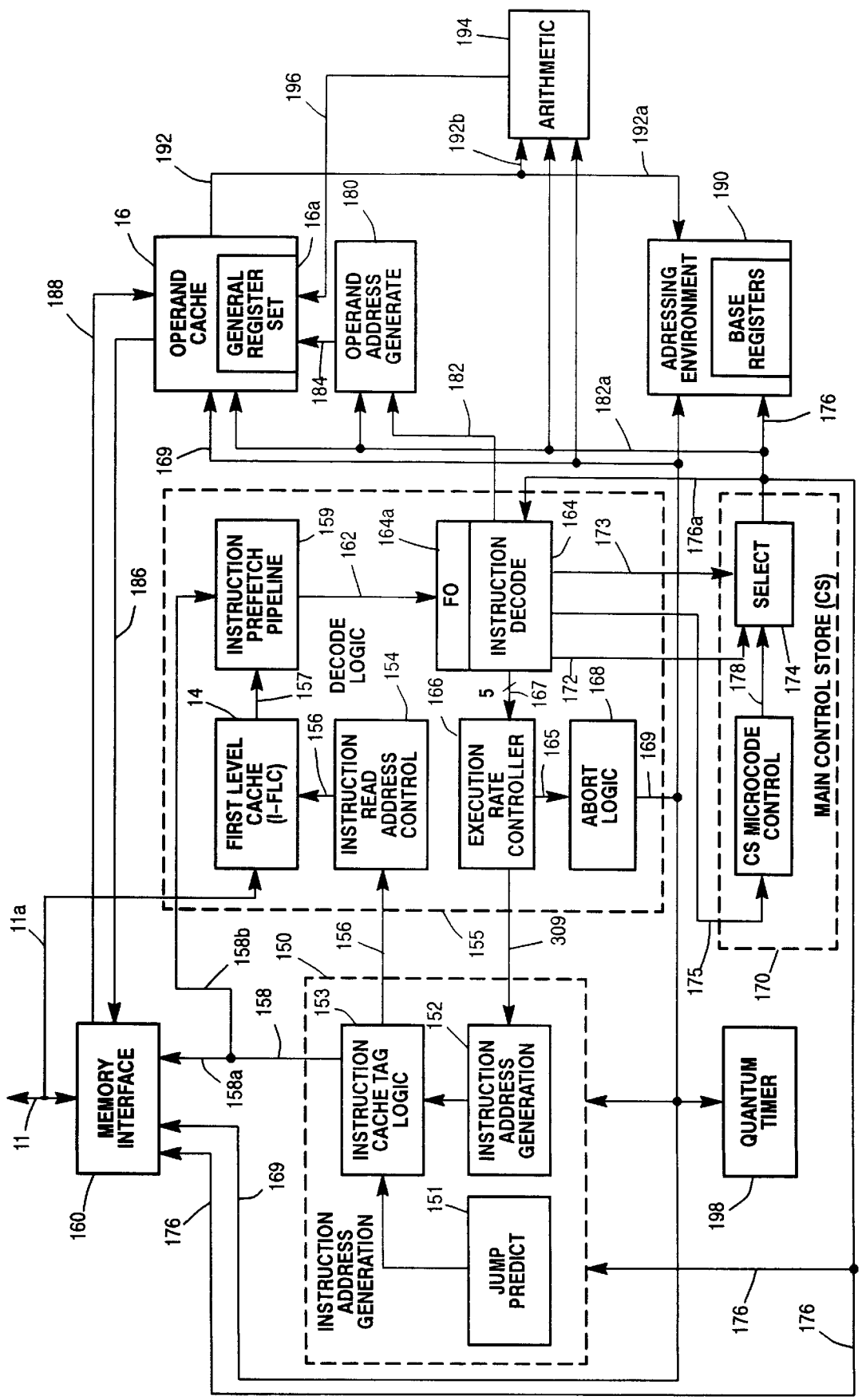
FIG. 7 is a block diagram of the major sections of an IP.

FIG. 7 is a block diagram of the major sections of an IP. Although this diagram does not provide a complete view of all data, address, and control paths, a subset of these paths is shown to facilitate an understanding of how the various IP sections interact.

An IP consists of multiple sections. An instruction address generate section 150 includes logic which generates an absolute instruction address by adding a relative address to the address of a designated base register. A jump predict subsection 151, and an instruction address generation subsection 152, provide absolute addresses to the instruction cache tag logic 153. The instruction cache tag logic 153 transfers the address to the instruction read address control logic 154, which resides in the instruction decode section 155, via interface 156. The instruction read address control logic 154 provides the address to the IP first-level instruction cache (I-FLC) 14 on address path 156. The address is used to retrieve eight instructions from each of the eight memory blocks (not shown) of the I-FLC 14. These eight instructions are transferred to the instruction prefetch logic over lines 157 where they begin encode within the instruction prefetch pipeline 159.

During stage 1Y, the instruction cache tag logic 153 indicates whether a cache hit occurred via lines 158b. If a cache miss occurred, the IP suspends execution. Lines 158a communicate the miss to the IP memory interface 160, which initiates a memory request to the storage controller 10 via interface 11.

The storage controller (SC) 10 provides the interface to the second-level cache segments, which contain the second-level instruction cache (I-SLC) 24. The SC further provides an interface to the appropriate memory storage unit (MSU) 20a or 20b, which will be accessed if the instruction is not resident in the I-SLC 24. When the instruction is returned from either the I-SLC 24 or a MSU 20a or 20b, it is provided on data path 11a to an 8-word read buffer 161, where it is latched at phase 1Y1B. The 8-word read buffer 161 further forwards the block over lines 163 to the I-FLC 14 to be cached, and to the instruction prefetch pipeline 159 so that instruction decode can begin.

If a cache miss did not occur, interface lines 158b select one of the eight instructions resident within the instruction prefetch pipeline 159 as the current instruction. The selected instruction is latched within the instruction prefetch pipeline 159 during phase 2A of stage 2Y, so that decode can begin within the instruction decode subsection 164 during the second half of stage 2Y. The selected instruction is loaded over lines 162 into the instruction register F0 164a and latched during phase 2A of stage 1X. Decode continues during the 1X stage. The instruction decode subsection 164 contains both hardware and microcode decode logic, as will be discussed in more detail below.

The instruction decode subsection 164 provides the five-bit cycle-slip count to the execution rate controller 166 over lines 167 late in stage 2Y and early in stage 1X. The execution rate controller 166 uses the cycle-slip count to control the IP execution rate, as will be discussed in detail below. The execution rate controller 166 interfaces with the abort logic section 168 via control signal 165. Together, the execution rate controller 166 and the abort logic section 168 control the execution rate of all other logic sections over lines 169. The execution rate controller 166 will be discussed in detail below.

The instruction decode subsection 164 further provides various control signals to the CS section 170. Control signals 172 for controlling the IP pipeline are provided to two-to-one multiplexer 174. Selection control for the two-to-one multiplexer 174 is provided by the select CS control signal 173. The select CS control signal 173 selects control signals 172 during all stages of standard instruction execution. Control signals 172 are thereby provided to all logic sections via the IP pipeline control lines 176 to control standard instruction execution.

Control signals 172 are also selected on the IP pipeline control lines 176 for the 1X stage during extended-cycle instruction execution. During all subsequent stages of extended-cycle instruction execution, however, the microcode-controlled signals 178 are selected by the select CS control signal 173 at the two-to-one multiplexer 174, and are provided to all logic sections to control instruction execution. The execution of extended-cycle instructions will be described in more detail below.

The hardware control signals generated by the instruction decode subsection 164 include addresses for the General Register Set (GRS) 16a. These addresses are provided over lines 182 to the Operand Address Generate section 180, where they are latched during phase 2X1A. The Operand Address Generate section 180 then generates a 24-bit operand absolute address, which is transferred to the Operand Cache (O-FLC) 16 on lines 184.

After the absolute operand address has been received by the O-FLC 16, the O-FLC logic determines whether the operand is resident in the O-FLC 16. If the operand is not resident, the IP suspends instruction execution and initiates a memory read using a real address generated by the O-FLC 16. This real address is transferred over lines 186 to the memory interface 160, which then controls the memory request to the SC 10 over interface 11. The SC 10 provides access to the second-level operand cache 26, and the MSUs 20a and 20b. After the SC 10 has completed the operand fetch, the operand is provided on interface 11 to the memory interface 160, which forwards the operand to the O-FLC 16 on lines 188.

If an operand cache hit occurs, or after execution has resumed in the case of an operand cache miss, the operand data is available at the end of the 2X stage. This data is provided to the addressing environment logic 190 over path 192a, where it is used in conjunction with the addressing signals provided on lines 182a to generate the next operand cache address. Operand data is further made available over lines 192b to the arithmetic section 194 during the end of the 2X stage. The arithmetic section 194 performs the multiply/divide, floating point, and decimal arithmetic operations for the machine during the first part of the 3X stage. The results are stored back to GRS 16a over lines 196 at the end of the 3X stage.

Finally, the IP includes a quantum timer 198 used to record processing time for billing purposes in multi-user systems. The quantum timer 198 is incremented every major clock cycle, except when the abort signal 169 is driven active, as will be described in detail below. As mentioned above, by accomplishing execution rate control and timer disabling using hardware instead of the operating system software, billing data is always correct.

Figure 8A:
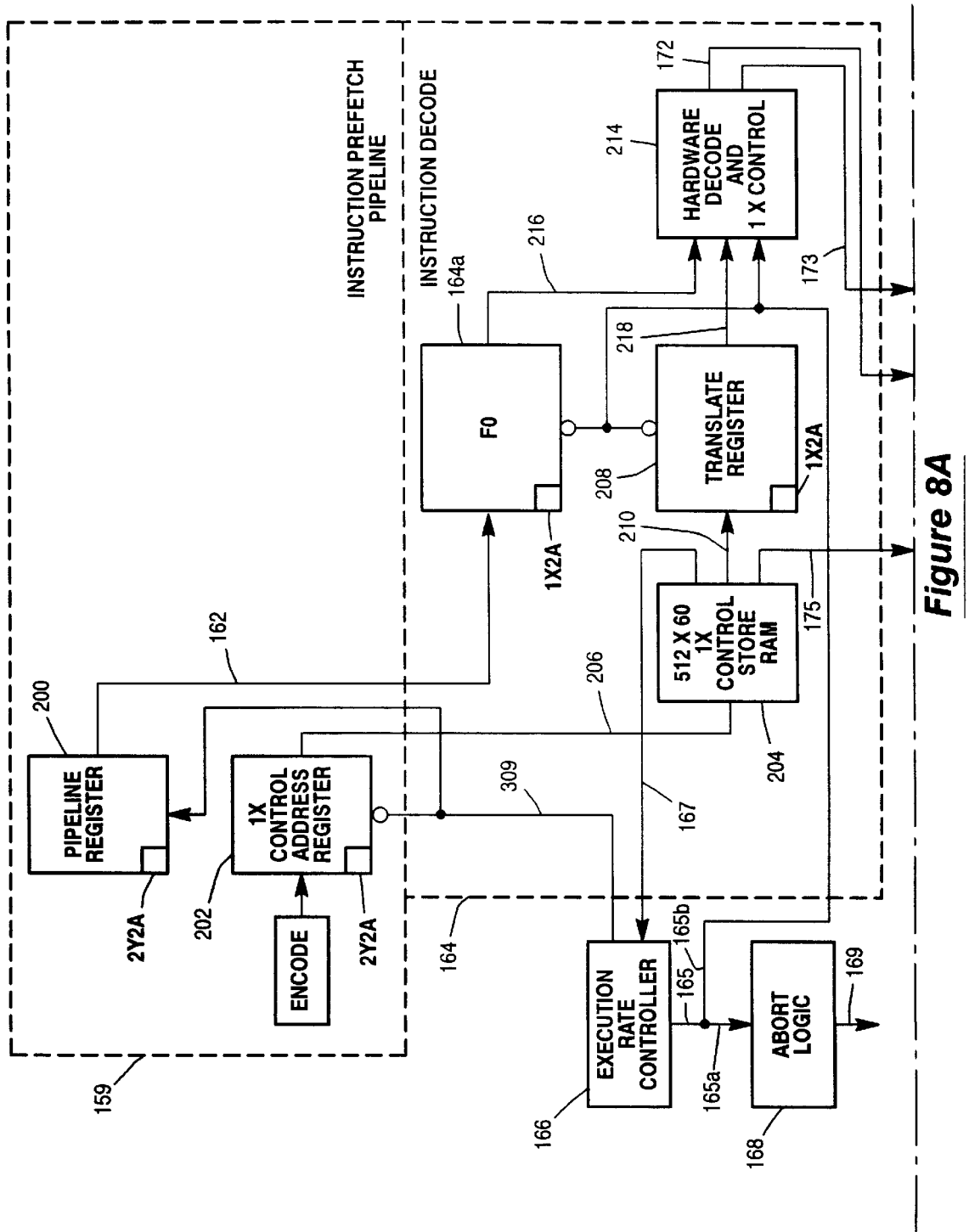
FIG. 8A and 8B, when arranged as shown in FIG. 8, is a schematic diagram of a portion of the decode logic section and the Main Control Store (CS) logic section.
Figure 8B:
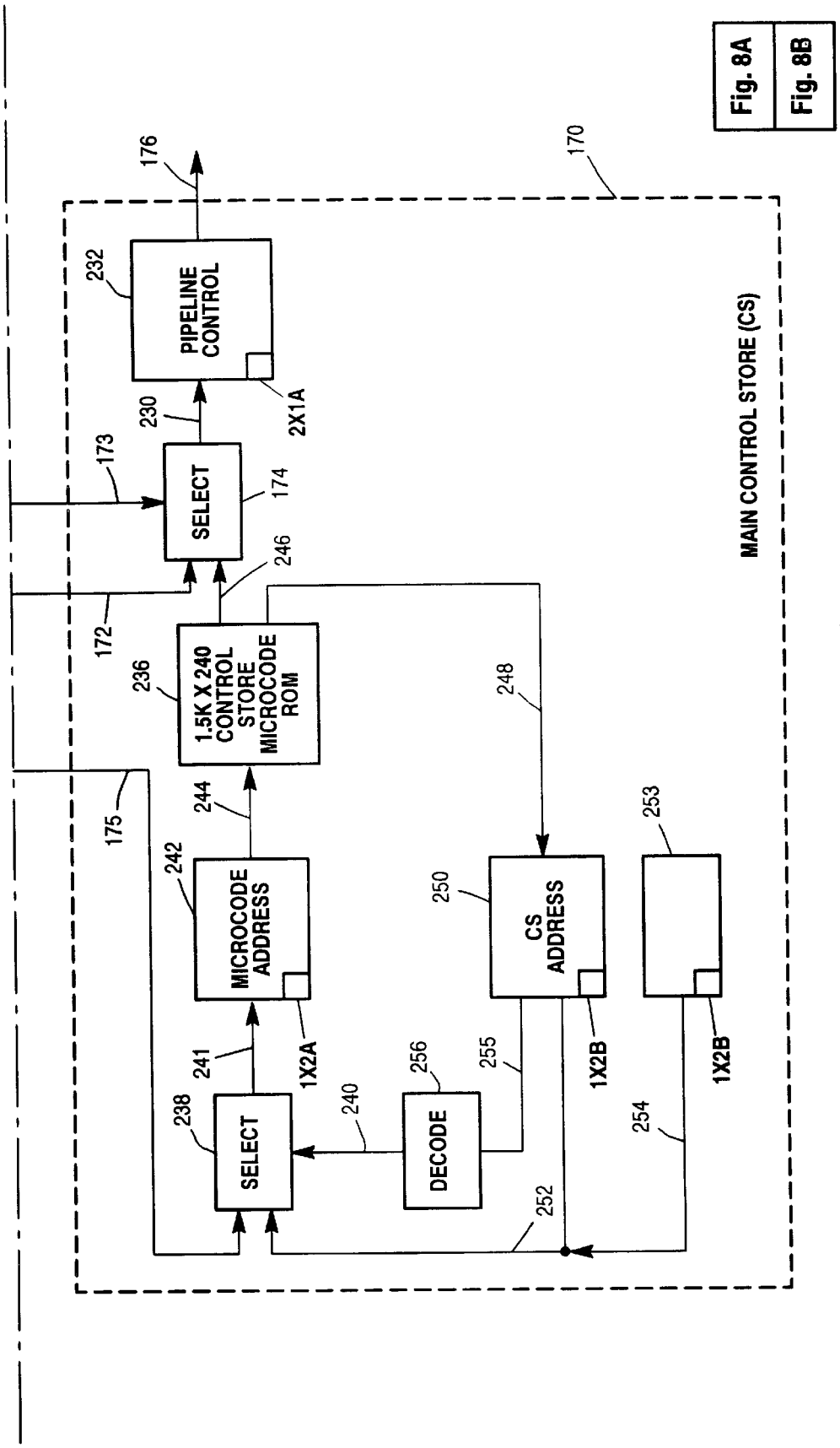

FIG. 8A and 8B, when arranged as shown in FIG. 8, is a schematic diagram of a portion of the decode logic 155 and the Main Control Store (CS) logic 170. An instruction is made available to the instruction decode subsection 164 after it is selected within the instruction prefetch pipeline 159 during stage 2Y. The selected instruction is latched into the pipeline register 200 during phase 2Y2A. Also during phase 2Y2A, an encoded portion of the instruction is latched into the 1X control address register 202. This data from control address register 202 is provided as the address to the 1X control store RAM 204 over path 206.

The 1X control store RAM 204 contains a unique set of control bits for each machine instruction. During the end of stage 2Y, the unique 60-bit control field is read from the 1X Control Store RAM 204. Selected ones of these bits are provided to the translate register 208 over path 210, and are latched during phase 1X2A. In addition, the 32-bit instruction from the pipeline register 200, which was provided to the instruction register (F0) 164a over path 162, is also latched during phase 1X2A. The latched information from the F0 register 164a and the translate register 208 is provided to the hardware decode logic 214 over paths 216 and 218, respectively, during phase 1X2A. In response thereto, the hardware decode logic 214 generates the pipeline control signals 172 and the select CS control signal 173. These signals provide control for the IP during the three stages of execution for standard instructions, and also provide control during the 1X stage of execution for extended-cycle instructions.

The pipeline control signals 172 are provided to a two-to-one multiplexer 174 within the main control store section 170. During all stages of execution or standard instructions, these signals are selected for propagation to path 230 by the select CS control signal 173, which is provided by the hardware decode logic 214. Control signals 172 are latched into the pipeline control latch 232 curing phase 2X1A, and are distributed on lines 176 to every section of the IP, including instruction address generation 150, memory interface 160, addressing environment 190, operand address generate 180, and the operand cache 16. In general, the control signals are latched within a respective logic section during phase 2X1B to provide control for the remainder of the 2X stage, and the 3X stage.

As discussed above and shown on FIG. 5, some instructions require more than the standard three stages to complete. For these extended-cycle instructions, the first stage of execution is called 1X, and the last two stages of execution are called 2X and 3X, respectively. All intervening stages are called extended, or "E" cycles, as described above. During execution of the 1X stage for extended-cycle instructions, the control signals 172 from the hardware decode logic 214 are selected by the select CS control signal 173 and provided to the IP pipeline control lines 176 in the same manner as described above. For all E stages of instruction execution, however, IP control signals are provided by the main control store section 170. Finally, for the 2X and 3X stages, the hardware decode logic 214 again takes control of the pipeline.

The switchover from control by the decode logic section 155 to control by the main control store logic section 170 during execution of an extended-cycle instruction occurs when the select CS control signal 173 goes active during phase 1X2A. When the select CS control signal 173 goes active, the IP control signals provided by the Control Store (CS) Microcode ROM 236 are selected for propagation to path 230, and are further provided to all sections of the IP logic on the IP pipeline control lines 176. The CS selection signal remains active until the 2B phase prior to the second to the last stage of execution for this instruction. At this time, one of the control lines 176 driven on lines 176a to the decode logic 155 goes active, thereby clearing the CS selection signal 173. This allows the control signals 172 from the hardware decode logic 214 to resume pipeline control.

The main control store logic section 170 is a microsequencer. The initial address for the microsequencer is provided by the 1X Control Store Ram 204 on path 175. This address is provided to the 2-to-1 multiplexer 238, is selected by the CS decode select signal 240, and propagates to path 241 during the 2Y2A phase. This address is latched by the microcode address register 242 during phase 1X2A, and is provided to the CS microcode ROM 236 on path 244. During phase 1X2A, control signals are read from the CS microcode ROM 236 onto path 246. Theses control signals provide information unique to each machine instruction. During extended-cycle instructions, the control signals read from the CS microcode ROM 236 during stage 1X are used to control IP execution during the first extended stage of instruction execution.

In addition to the control signals provided on path 246, the CS microcode ROM 236 provides address and control bits on path 248, which are latched into the CS address register 250 during phase 1X2B. The address bits latched by the CS address register 250 are provided on path 252 to the 2-to-1 multiplexer 238. The control store logic section 170 also has a status register 253, which latches various system state indicators during phase 1X2B. These state indicators are provided to the 2-to-1 multiplexer 238 on lines 254.

The control bits latched into the CS address register 250 are provided on path 255 to the CS decode logic 256, which generates selection signal 240. During all extended stages of execution for extended-cycle instructions, the selection signal 240 selects the address bits on path 252 and the state indicators on path 259 as the address to the CS Microcode ROM 236. Therefore, the address bits and status indicators generated during stage 1X or during any extended stage (except the last extended stage) provide the address for the next stage of instruction execution.

B. EXECUTION RATE CONTROLLER

As mentioned above, prior art machines inject cycle slips into selected instructions primarily by modifying the CS microcode memory within the main control store logic section 170. For an extended-cycle instruction, the microcode within the CS memory 236 was changed to include No Operation Instructions (NOPs). Each of the additional NOP instructions impose a one-cycle slip. If cycle-slips were to be injected during the execution of a standard instruction, both the 1X control store RAM 204 and the CS memory 236 had to be modified. The 1X control store RAM 204 data was modified so that the standard instruction was converted to an extended-cycle instruction. The CS memory 236 was then modified to contain the desired number of NOP instructions.

Unlike past machines, the IP of the current invention has a CS microcode ROM 236, not a microcode RAM. As such, cycle slips can not readily be imposed by modifying this memory. In addition, the CS microcode ROM is just large enough to accommodate all functional instructions, and does not have spare addresses for workaround or do-nothing code. Therefore, the execution rate controller of the current invention was developed.

The execution rate controller of the current invention may be integrated into the above-described pipelined IP architecture to control the rate of execution of the IP. Alternatively, it may be incorporated with other IP architectures, as would be apparent to those skilled in the art.

Figure 9:
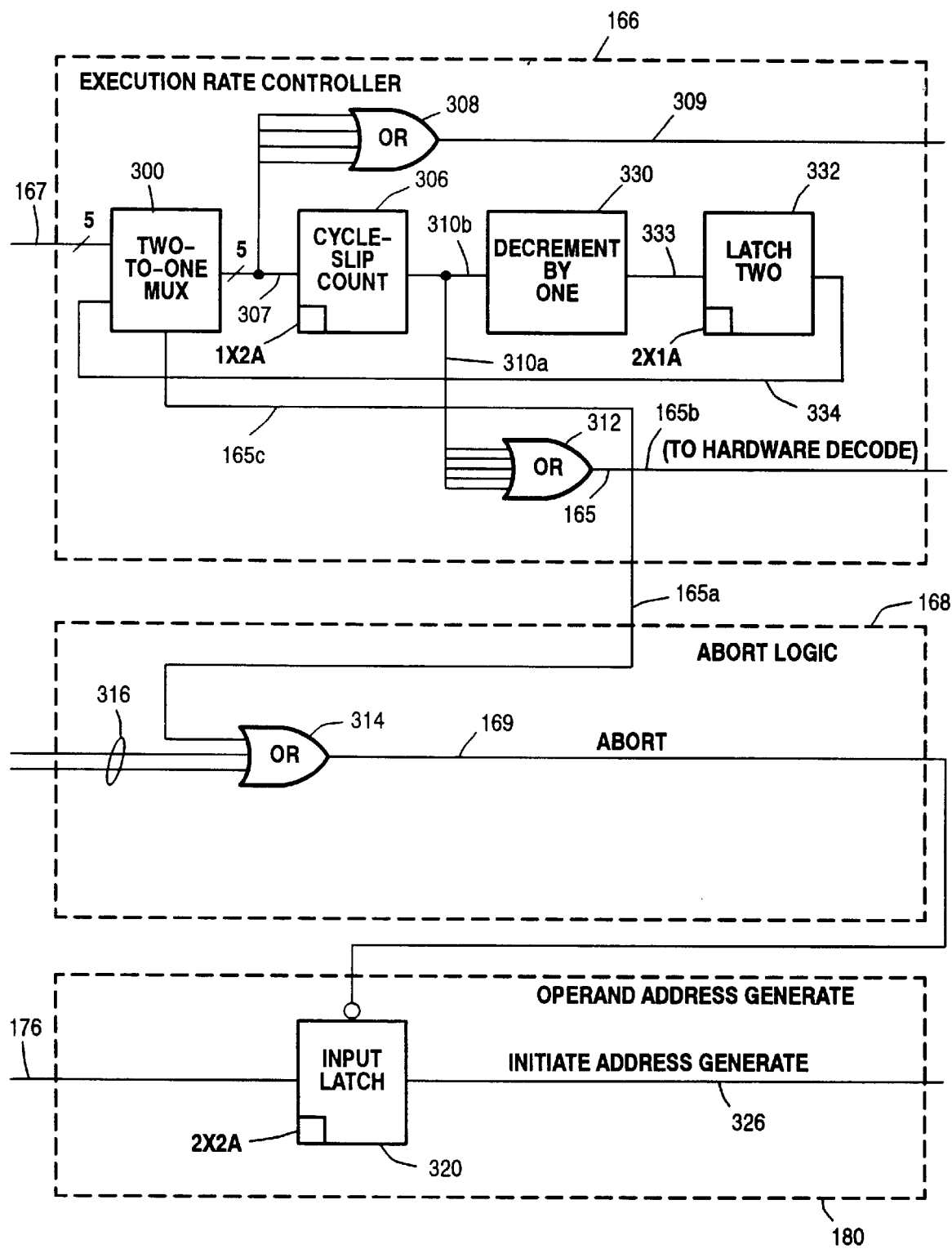
FIG. 9 is a schematic logic diagram of the execution rate control hardware.

FIG. 9 is a schematic logic diagram of the execution rate control hardware, and includes the execution rate controller within dashed block 166 and the abort logic within dashed block 168. Five bits of execution rate information 167 are provided by the 1X control store RAM 204 to a two-to-one multiplexer 300 during phase 2Y2A. The execution rate information 167 is selected by cycle-slip signal 165 on line 165c, which is low inactive during the 1X stage of instruction execution for both standard and extended-cycle instructions.

The execution rate information 167 propagates onto lines 307, where it is provided to OR gate 308 during phase 2Y2A. If any of the five bits of execution rate information 167 are high, the 2Y2A cycle-slip signal on line 309 is driven to the instruction prefetch pipeline 159 to prevent the pipeline register 200 and the 1X (control address register 202 from being loaded with the next instruction on the next 2A clock. As a result, the next instruction, which has already been fetched from cache when the 2Y2A cycle-slip signal on line 309 goes active, will remain in a holding register until the 2Y2A cycle-slip signal de-activates.

The execution rate information on lines 307 is further provided to as the cycle-slip count to rate latch 306 where it is latched during phase 1X2A. This cycle-slip count from latch 306 is driven onto lines 310a to OR gate 312. If any of the five bits of the cycle-slip count on lines 310a is high active, the cycle-slip signal on line 165 is driven high active onto lines 165a, 165b, and 165c. The signal on line 165a is driven to OR gate 314 in the abort logic section 168. If the signal on line 165a, or any of the other abort conditions 316, is active, the abort signal on line 169 is driven active to all external IP logic sections including instruction address generation shown in dashed block 150, memory interface 160, addressing environment 190, operand address generate 180, and the operand cache 16. Other abort conditions 316 can occur because of interrupts, jumps to new code banks, or other processing conditions unrelated to the current invention. As such, other abort conditions 316 will not be discussed further.

As mentioned above, all logic sections receive valid signals on respective ones of the IP pipeline control lines 176 during phase 2X1A. During normal instruction execution that is, during instruction execution when the abort signal on line 169 is not driven active, the respective ones of the IP pipeline control lines 176 are latched within the associated logic section during phase 2X2A, where they are used to initiate hardware and microcode sequences which control instruction execution within the associated logic section. When the abort signal is activated, however, the abort signal propagates to all logic sections during phase 1X2A, where it blocks the start of hardware and microcode sequences, preventing instruction execution from continuing.

FIG. 9 illustrates how the abort signal on line 169 may be used to block instruction execution. The operand address generate section 180 receives valid high-active signals on respective ones of the IP pipeline control lines 176 during phase 2X1A. During normal operation, these signals are latched within input latch 320 during phase 2X2A. When the abort signal is driven high active to the latch enable, the latch 320 is disabled, and the IP pipeline control lines 176 are not latched.

FIG. 9 shows one manner of using the abort signal on line 169 to block sequence initiation within a respective logic section. However, other methods of blocking execution are known to those skilled in the art, and could include gating data or clock inputs to associated input latches.

In addition to blocking sequence initiation, the abort signal on line 169 is also driven to the quantum timer 198, as shown in FIG. 7. As discussed above, the quantum timer 198 is normally incremented every major clock cycle. This timer records the amount of processing time used by each user of the system for billing purposes. Timer incrementation is inhibited when the abort signal is active so that users are not billed for the major cycles which are "slipped" because of non-zero execution rate information supplied to the execution rate controller 166.

In addition to being driven to the abort logic section 168, the cycle-slip signal on line 165 is also driven to the hardware decode logic 214 of the decode logic section 155 on line 165b. The cycle-slip signal on line 165 is used by the hardware decode logic 214 to prevent the select CS control signal 173 from being driven active during phase 1X2A of extended-cycle instruction execution. Thus, whenever any of the five bits of the cycle-slip count on lines 310a is high, the IP pipeline control lines 176 are driven by the decode logic section 155, not the main control store section 170. The activated cycle-slip signal on line 165b also prevents the F0 and translate registers 164a and 208, respectively, from being re-clocked during the slipped cycles. Because IP instruction decodes are voided and sequences are effectively idled within all sections of the IP logic, the IP is halted in stage 1X until the cycle-slip count in latch 306 is decremented to zero.

The initial execution rate information in latch 306 determines how many major cycles, or stages, the IP 12 will be halted before execution resumes. This cycle-slip count is provided from latch 306 to decrement-by-one combinational logic 330 over lines 310b. Decrement-by-one combination logic 330 decrements the cycle-slip count by one, and provides the updated cycle-slip count to latch 332 over lines 333, where it is latched during phase 1A of the stage following 1X. Latch 332 further provides the updated cycle-slip count to the two-to-one multiplexer 300 over lines 334. Assuming the original cycle-slip count stored in latch 306 during phase 1X2A is nonzero, the cycle-slip signal on line 165 is driven active as discussed above. At the two-to--one multiplexer 300, the cycle-slip signal on line 165, which is driven over line 165c to two-to-one multiplexer 300, selects the updated cycle-slip count from latch 332. This updated count is latched into latch 306 during phase 2A of the stage following stage 1X, where it is again provided to decrement-by-one combinational logic 330, and is again decremented.

The above-described decrementation process continues until the cycle-slip count in latch 306 is zero. At this time, the cycle-slip signal on line 165 is driven inactive to all logic signals within the IP. This allows the next instruction fetch to be initiated by the instruction address generation logic section 152, and further enables the selected registers within the decode logic section 155. If the current instruction resident in the F0 register 164a is an extended-cycle instruction, de-activation of the cycle-slip signal 165 allows the hardware decode subsection 164 to drive the Selection CS Control signal on line 173 so that the Main Control Store subsection 170 can assume control of the pipeline, and drive IP pipeline control lines 176.

During the stage following the de-activation of the cycle-slip signal on line 165, the IP pipeline control lines 176 are latched into associated logic sections at phase 2A so that sequences can begin. Also during this time, the next instruction can be clocked into the F0 register 164a, and the pipeline execution can resume. Finally, since the cycle-slip signal on line 165 is driven inactive over line 165c, the five-bit cycle-slip count on line 167 provided by the 1X Control Store RAM 204 is once again selected at the two-to-one multiplexer 300 so that new execution rate information associated with the next instruction can be loaded into the latch 306 from the 1X control store RAM 204.

Figure 10A:
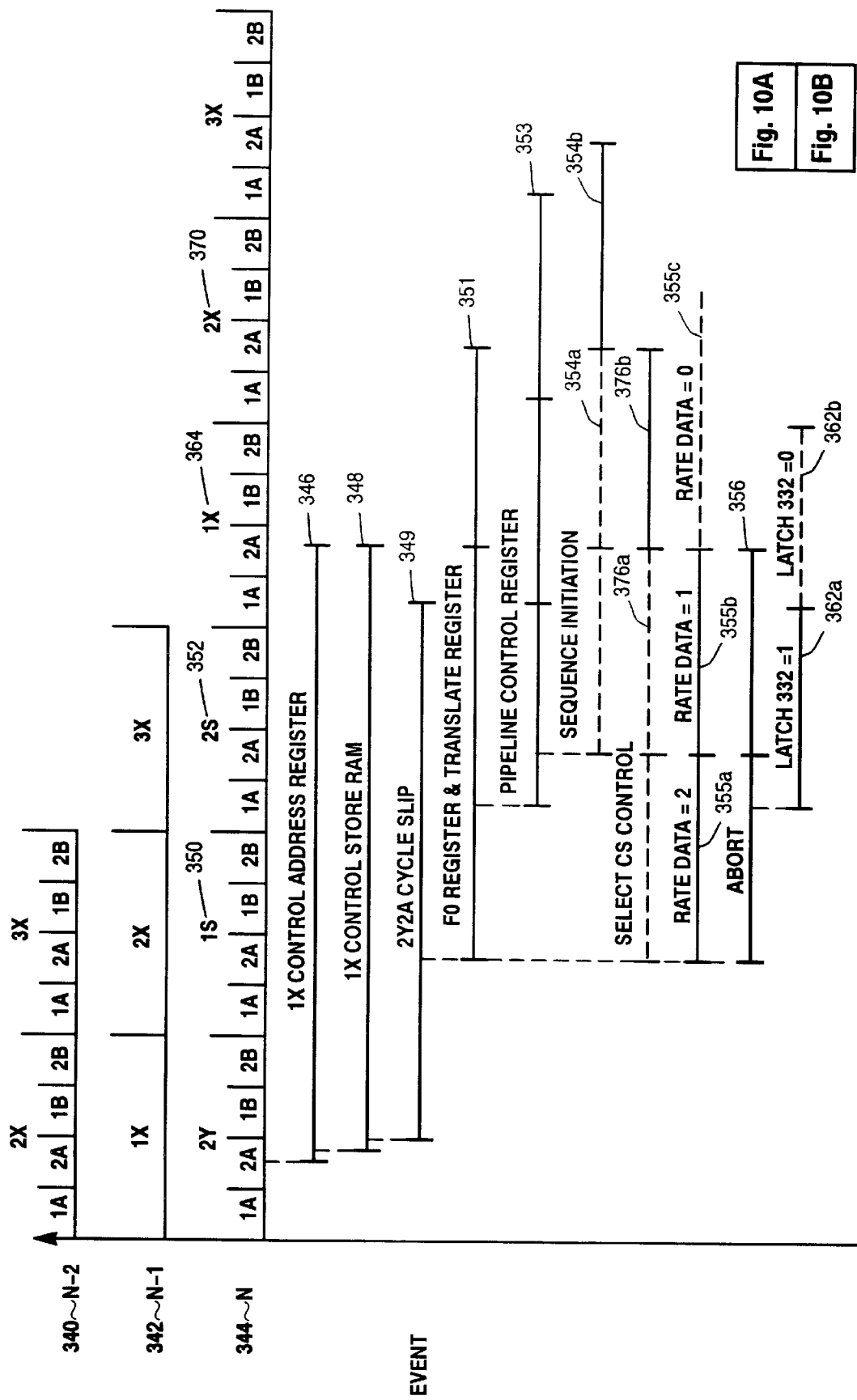
FIG. 10A and FIG. 10B, when arranged as shown in FIG. 10, are a timing diagram showing a two-cycle slip associated with a standard instruction.
Figure 10B:
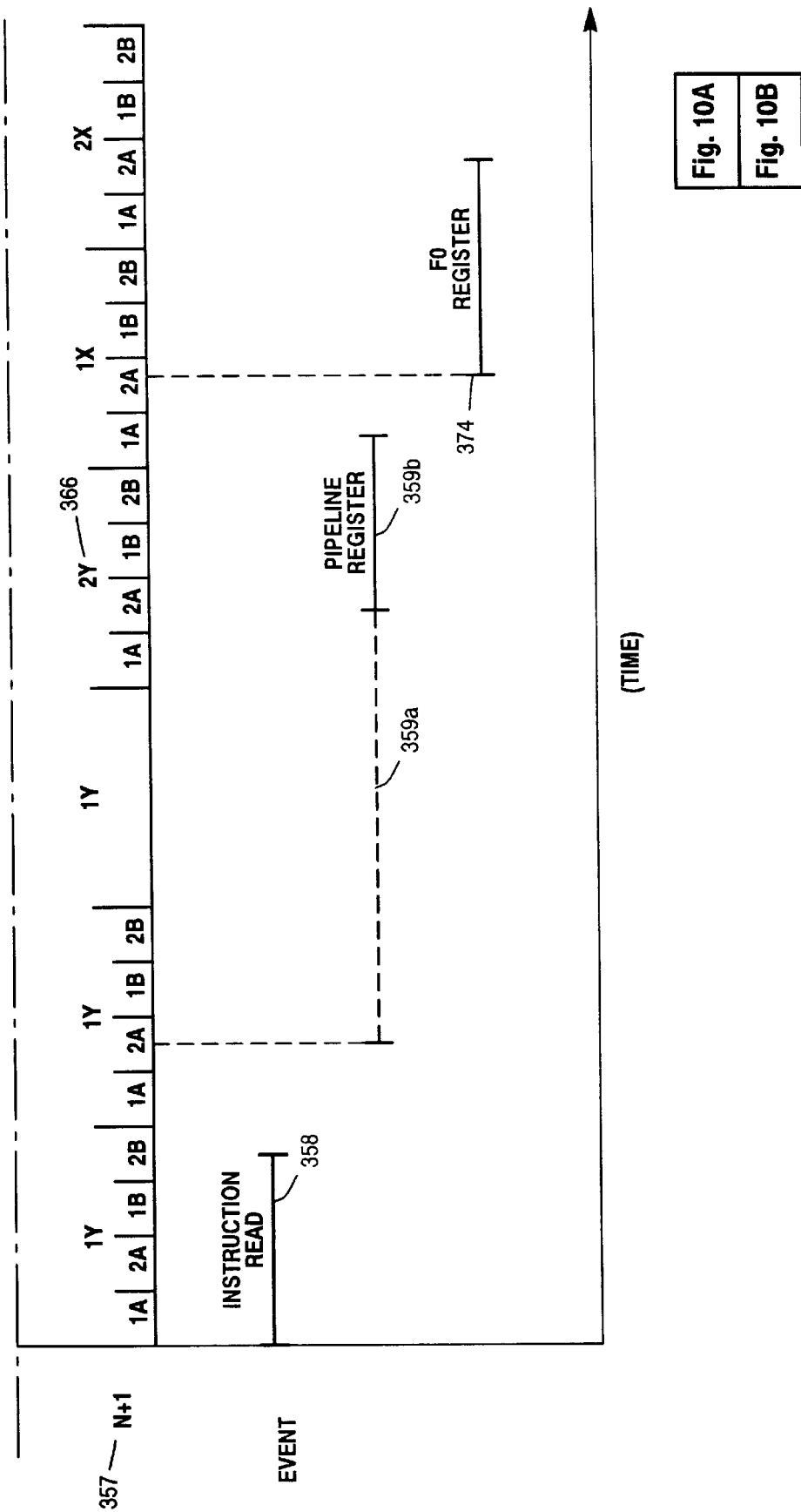

FIG. 10A and FIG. 10B, when arranged as shown in FIG. 10, are a timing diagram showing a two-cycle slip associated with a standard instruction N 344. Instruction N-2 340 and N-1 342 are resident in the IP instruction pipeline prior to the start of the execution of instruction N 344. Therefore, when instruction N 344 is in the prefetch pipeline during stage 2Y, instruction N-1 342 is in stage 1X, and instruction N-2 340 is in stage 2X.

During phase 2A of stage 2Y, instruction N 344 data is latched into the 1X control address register 202, as illustrated by line 346. Data from the 1X control address register 202 is applied to the 1X control store RAM 204, and execution rate information is provided to the execution rate controller 166. During the 2A phase of stage 2Y, non-zero execution rate information results in the 2Y2A cycle-slip signal on line 309 going active, as indicated by line 349 and as discussed below.

During phase 2A of the next stage, which will be referred to as stage 1S 350, instruction N 244 information is latched in the instruction register (F0) 164a and the translate register 208, as indicated by line 351. During phase 1A of the next stage labeled 2S 352, pipeline control signals are latched into the pipeline control register 232, as indicated by line 353.

During normal execution (when the abort signal 169 does not go active), the IP pipeline control signals 176 driven by the pipeline control register 232 are driven to all IP logic sections to be latched for sequence initiation during phase 2A, as indicated by dashed line 354a. However, sequence initiation is prevented from occurring because of the non-zero execution rate information latched into rate data latch 306 during phase 2A of stage 1S, as shown by line 355a. The abort signal goes active during phase 2A of stage 1S, as indicated by line 356, blocking sequence initiation. Since all of the sequence information generated by the decode section 155 during stage 1S 350 is unused, the 1S stage is said to be a stage which is "slipped".

Just as the N instruction is being prevented from entering stage 1X during a cycle-slip, the N+1 instruction 357 is prevented from entering the 2Y stage of execution. The N+1 instruction 357 is read from the instruction cache 14 during stage 1Y, as shown by line 358. During normal pipelined execution, this instruction would be latched into the pipeline register 200 at phase 2Y2A, thereby allowing decode to begin, as shown by dashed line 359a. When the 2Y2A cycle-slip signal 309 is active, however, the N+1 instruction 357 is instead maintained in a holding register until the 2Y2A cycle-slip signal goes inactive, as will be discussed below.

During phase 2A of stage 1S 350, the cycle-slip count from latch 306 is submitted to the decrement-by-one circuit 330. The decremented cycle-slip count, which is now equal to one, is latched in latch 332 during phase 1A of stage 2S 352, as shown by line 362a. During phase 1A of stage 2S 352, this cycle-slip count propagates through the two-to-one multiplexer 300 and is latched in latch 306, as indicated by line 355b. The cycle-slip count is decremented to zero and latched in latch 332 during phase 1A of stage 1X 364, as shown by dashed line 362b. Shortly thereafter, the 2Y2A cycle-slip signal 309, shown by line 349, goes inactive.

When the 2Y2A cycle-slip signal on line 309 goes inactive, as shown by line 349, the next instruction N+1 357 is latched into the pipeline register 200 at phase 2A of what is the 2Y stage 366 for this instruction, as indicated by solid line 359b.

At the same time as the N+1 instruction data 357 is being clocked into the pipeline register 200, the N instruction data 344 is re-latched into the F0 register 164a and the translate register 208 during what is now stage 1X 364, as indicated by line 351. It may be noted that instruction N was already present in the F0 register 164a and the translate register 208 during the previous slipped cycles, so that although the F0 register 164a and the translate register 208 are re-clocked at this time, the latched instruction does not change. It may also be noted that even though the N instruction 344 is relatched into the F0 register 164a, the cycle-slip count for instruction N 344 is not re-latched into latch 306 in the execution rate controller 166. This is because the cycle-slip signal on line 165c is still selecting the updated cycle-slip count from latch 332 as the input to latch 306, as shown on line 355.

At phase 2A of stage 1X, the updated cycle-slip count, which is now equal to zero, is latched into latch 306, as indicated by dashed line 355c. This causes the abort signal to go inactive. Finally, during phase 1A for stage 2X 370 for the N instruction 344, the pipeline control register 232 is re-latched with the sequence initiation data. Because of the de-activation of the abort signal, sequence initiation is started at phase 2A of stage 2X, as shown by solid line 354b. Also at this time, the N+1 instruction 357 is latched into the F0 register 164a as shown by line 374, so that pipeline execution is resumed.

As can be seen by FIG. 10, the cycle-slip count which is initially loaded into latch 306 determines how many stages, or cycles, will be "slipped" before normal pipeline execution resumes. In this example, loading "two" into latch 306 causes the N instruction 344 to slip two cycles.

As illustrated by FIG. 10, using "two" as the initial cycle-slip count causes both the N-2 instruction 340 and the N-1 instruction 342 to complete execution before the N instruction 344 enters 1X stage 364 of execution. Thus, using a cycle-slip count of two or more for the N instruction 344 clears (or "de-pipes") the pipeline before the start of execution for the N instruction. Since many problems encountered during hardware debug are the result of unforeseen interactions between the three instructions within the IP execution pipeline, de-piping the IP by injecting a cycle slip of at least two stages for the N instruction can often be used as a workaround to solve problems associated with the N instruction until an actual hardware fix can be implemented. Since each instruction is associated with it's own cycle-slip count, the execution rate need only be slowed for those instructions associated with problems. This mechanism can also be used to slow the IP a uniform amount for all IP instructions so that the execution rate can be tailored to slower peripheral devices.

It should be mentioned that the timing associated with extended-cycle instruction slips is basically the same as that shown in FIG. 10 for standard IP instructions. During extended-cycle instruction execution, the select CS control signal shown on line 173 of FIG. 7 normally goes active during phase 2A of stage 1X, as shown by dashed line 376a. However, when non-zero cycle-slip count is entered into latch 306, the select CS control signal on line 173 is prevented from activating by the cycle-slip signal on line 165. The select CS control signal is finally allowed to activate during phase 2A of stage 1X 364 after the cycle slip signal is deactivated as shown by solid line 376b. The activation of the select CS control signal on line 173 allows the CS microcode ROM 236 to assume control of the IP pipeline for all extended stages of execution subsequent to 1X. Therefore, if the N instruction 344 were an extended-cycle instruction, the 2X stage 370 would instead be labeled 2E since extended execution would be commenced at this time.

C. Programming Cycle-Slips

The execution rate controller of the current invention is programmed using a scan interface for scan-set testing that is well-known to those skilled in the art.

Figure 11:
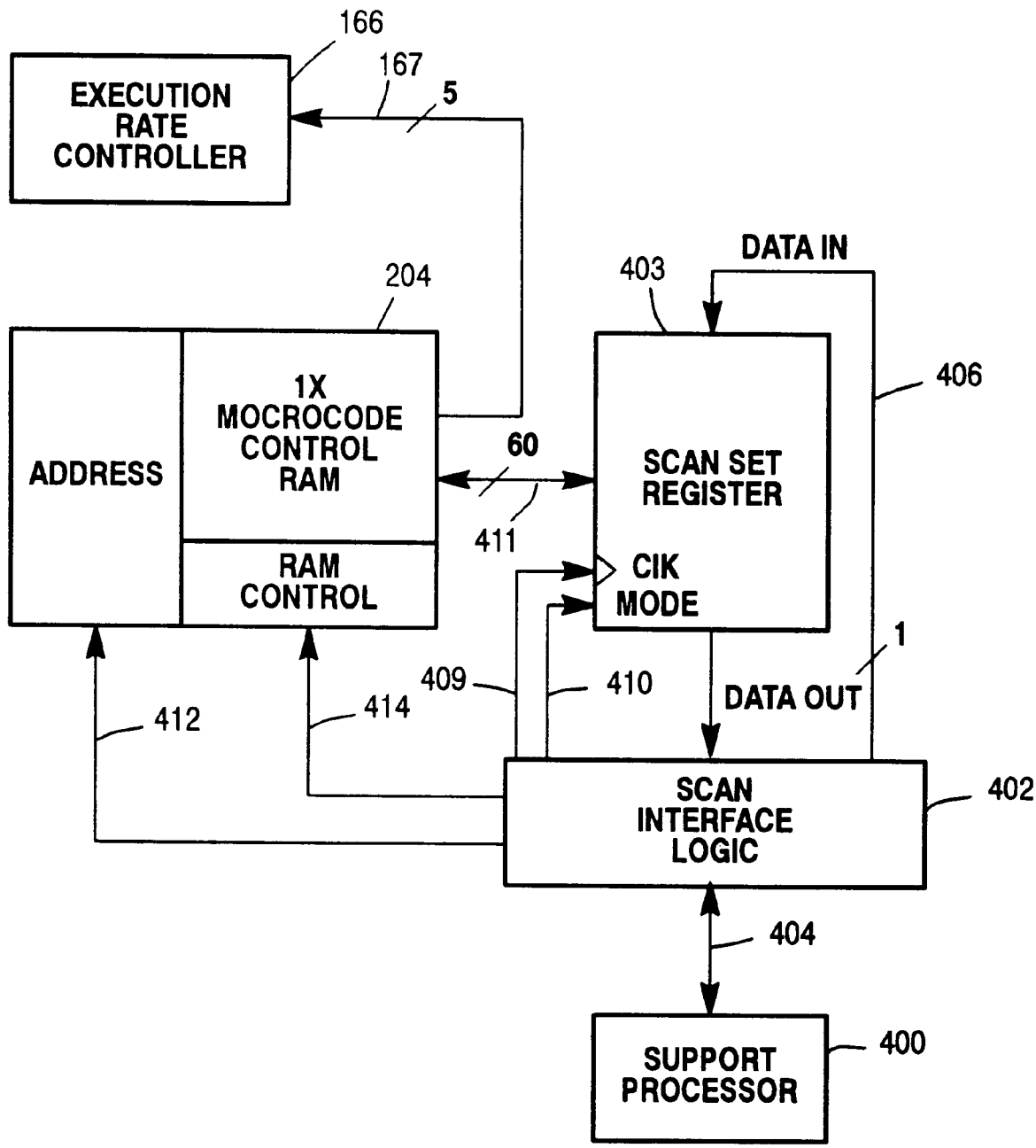
FIG. 11 is a diagram of the scan interface used to write data to the 1X microcode control RAM.

FIG. 11 is a diagram of the scan interface used to write data to the 1X microcode control RAM 204. Data may be written from the support processor 400 to the scan interface logic 402 across parallel interface 404. The scan interface logic 402 writes this data across serial interface 406 to the scan-set register 408. The scan interface logic 402 provides clock and control information to the scan-set register 408 across lines 409 and 410, respectively. After all 60 bits of data are shifted into the scan-set register 408, this data is written across parallel interface 411 to the 1X microcode control RAM 204. The RAM address and control lines for this write are provided to the 1X microcode control RAM 204 across lines 412 and 414, respectively.

Each instruction in the IP instruction set is associated with one 60-bit word within the 1X microcode control RAM 204. Each 60-bit word includes a predetermined number of bits containing the cycle-slip count, which is provided on line 167 to the execution rate controller 166. In the described embodiment, the cycle-slip count is 5-bits long, thereby allowing between zero and 31 cycle slips to be imposed on any given instruction. As previously mentioned, this allows each instruction to be programmed with a unique cycle-slip count to implement temporary workarounds during hardware test. Alternatively, Each instruction can be programmed with the same uniform cycle-slip count so that a faster IP can be tailored to operate with slower peripheral and memory devices.

In view of the detailed descriptions and drawings, various modifications or implementations will become apparent to those skilled in the art without departing from the spirit and scope of the invention, and what is described to be protected by Letters Patent is set forth in the appended claims.

What is claimed is:

1. For use in a data processing system having an instruction processor capable of executing a set of machine instructions in an associated predetermined number of execution cycles, the instruction processor having decode logic for receiving and decoding the machine instructions and for providing execution control signals for each instruction, the instruction processor further having sequence logic for receiving the execution control signals and for performing the execution of each machine instruction, the execution rate control system comprising:

storage means for storing a selectable cycle-slip count for each instruction in the instruction set;

cycle-slip count modification means coupled to said storage means for receiving said selectable cycle-slip count, and for modifying said cycle-slip count by a predetermined amount during each predetermined number of execution cycles;

abort means coupled to said cycle-slip count modification means for receiving said cycle-slip count and for blocking the reception of the execution control signals by the sequence logic when said cycle-slip count is within a predetermined range of values.

2. The execution rate control system as in claim 1 wherein the data processing system further includes counter means for counting the number of execution cycles elapsed during a predetermined set of instructions, and wherein said abort means is coupled to said counter means for disabling said counter means when said cycle-slip count is within a predetermined range of values.

3. The execution rate control system as in claim 1, and further including a maintenance interface for programming said storage means.

4. For use in a data processing system having an instruction processor capable of executing a first class of machine instructions in a predetermined number of execution cycles and a second class of machine instructions in a variable number of execution cycles in excess of the predetermined number of cycles, an instruction execution control system comprising:

storage means for storing instruction control signals associated with one or more of the first class of machine instructions and one or more of the second class of machine instructions;

decode means coupled to said storage means for receiving selected first ones of said instruction control signals, and for receiving and decoding each machine instruction, for determining whether the instruction is in the first class of machine instructions or the second class of machine instructions, and for providing first operation control signals during the predetermined number of execution cycles if the instruction is in either the first class of machine instructions or the second class of machine instruction;

microcode controller means coupled to said storage means for receiving selected second ones of said instruction control signals, and for providing second operation control signals during the variable number of execution cycles in excess of the predetermined number of execution cycles if the instruction is in the second class of machine instructions;

selection means coupled to said decode means and to said microcode controller means for selecting said first operation control signals from said decode means if the instruction is in the first class of machine instructions, for selecting said first operation control signals from said decode means during said predetermined number of execution cycles if the instruction is in the second class of machine instructions, and for selecting said second operation control signals from said microcode controller means during the variable number of execution cycles if the instruction is in the second class of machine instructions;

sequence means coupled to said selection means for receiving said selected ones of said operation control signals, and for executing the instruction under the control of said selected ones of said operation control signals;

data modification means coupled to said storage means for receiving selected third ones of said instruction control signals as instruction cycle-slip count signals, and for modifying said instruction cycle-slip count signals by a predetermined amount during each predetermined number of execution cycles;

cycle-slip means for generating a slip signal when said cycle-slip count signals are within a predetermined range of values;

abort means coupled to said cycle-slip means for receiving said slip signal, and for providing an abort signal to said sequence means when said slip signal is received to block reception of said selected ones of said operation control signals, and for providing said abort signal to said selection means to force said selection means to select said first operation control signals from said decode means.

5. The instruction execution control system of claim 4, and further including timer means coupled to said abort means for receiving said abort signal, said timer means for counting the number of execution cycles required to execute predetermined groups of the first class of machine instructions and the second class of machine instructions, and for suspending said counting when said abort signal is received.

6. The instruction execution control system of claim 4, and further including maintenance interface means coupled to said storage means for reading said instruction control signals from, and writing said instruction control signals to said storage means.

7. The instruction execution control system of claim 4 wherein said storage means is capable of storing a distinct set of instruction control signals for each one of the first class and the second class of machine instructions.

8. For use in an instruction processing system capable of executing each of the instructions of a predetermined instruction set in an associated number of execution cycles, the execution rate control system, comprising:

control means for receiving an instruction and for providing associated operation control signals;

sequence means coupled to said control means for receiving said associated operation control signals and for executing said received instruction in the associated number of execution cycles;

storage means for storing sets of cycle-slip count signals, wherein each of said sets of cycle-slip count signals is associated with one or more of the instructions of the predetermined instruction set;

cycle-slip count modification means coupled to said storage means for receiving one of said sets of cycle-slip count signals associated with said received instruction, and for modifying said received set of cycle-slip count signals by a predetermined amount during each predetermined number of clock cycles; and abort means coupled to said cycle-slip count modification means for receiving said modified set of cycle-slip count signals, and for preventing said sequence means from receiving said associated operation control signals when said modified set of cycle-slip count signals is within a predetermined range of values, and for preventing said control means from receiving another instruction.

9. The execution rate control system of claim 8, and further including timer means coupled to said abort means for receiving said abort signal, said timer means for counting the number of execution circles required to execute predetermined groups of the first class of machine instructions and the second class of machine instructions, and for suspending said counting when said abort signal is received.

10. The execution rate control system of claim 8, and further including maintenance interface means coupled to said storage means for reading said instruction control signals from, and writing said instruction control signals to said storage means.

11. The execution rate control system of claim 8 wherein said storage means is capable of storing one of said sets of cycle-slip count signals for each one of the instructions of the predetermined instruction set.

12. A instruction processor execution control system providing control for pipelined execution of machine instructions in pipelined stages, wherein a first class of the machine instructions can be executed in a predetermined number of execution stages and a second class of the machine instructions can be executed in a variable number of execution stages in addition to the predetermined number of execution stages, the execution control system comprising:

a storage device to store a plurality of sets of instruction control signals, each of said plurality of sets of instruction control signals being associated with one or more of the machine instructions;

a decode device to receive and decode each machine instruction, and to provide first operation control signals during the predetermined number of execution cycles if the instruction is in the first class of machine instructions or the second class of machine instructions;

a microcode sequencer to provide second operation control signals during the variable number of execution cycles if the instruction is in the second class of machine instructions;

a selection device coupled to said decode device and to said microcode sequencer to select said first operation control signals from said decode device during the predetermined number of execution stages, and to select said second operation control signals from said microcode sequencer during the variable number of execution stages;

sequence logic coupled to said selection device for receiving said selected ones of the operation control signals, and for executing the instruction under the control of said selected ones of the operation control signals;

incrementation/decrementation logic coupled to said storage device for receiving predetermined ones of said instruction control signals as an instruction cycle-slip count, and for modifying said instruction cycle-slip count by a predetermined amount during each predetermined number of execution cycle; and abort logic coupled to said incrementation/decrementation logic to receive said cycle-slip count, and to provide an abort signal to said sequence logic when said cycle-slip count is within a predetermined range of values, said abort signal to block reception of said selected ones of the operation control signals by said sequence logic and to cause said selection device to select operation control signals from said decode device.

13. The instruction processor execution control system of claim 12, and further including a counter/timer circuit coupled to said abort logic, said counter/timer circuit to count the number of execution cycles required to execute predetermined groups of the first class of machine instructions and the second class of machine instructions, and to suspend said counting when said abort signal is received.

14. The instruction processor execution control system of claim 12, and further including a maintenance interface to modify said instruction control signals stored in said storage device.

15. The instruction processor execution control system of claim 12 wherein said storage device is capable of storing a distinct one of said plurality of sets of instruction control signals for each one of the first class and the second class of machine instruction.

16. In a digital instruction processor having a storage device, and being capable of executing each instruction in a predetermined instruction set, the digital instruction processor further having an associated set of execution rate signals recorded in the storage device for each instruction in the predetermined instruction set, the digital instruction processor having a control circuit to provide associated operation control signals for each instruction, and further having one or more sequencers to receive the associated operation control signals and to execute the instruction in an associated number of instruction execution cycles, and further having a counter circuit to count the instruction execution cycles in a predetermined group of instructions, the method for controlling the execution rate of the digital instruction processor, comprising the steps of:

(a) obtaining one of the instructions and generating the associated operation control signals;

(b) obtaining the associated set of execution rate signals for said one of the instructions;

(c) providing the associated operation control signals to one or more of the sequencers to execute said one of the instructions if the associated set of execution rate signals is not within a predetermined range of values, and returning to step (a) when instruction execution is complete;

(d) blocking the associated operation control signals from receipt by the one or more sequencers if the associated set of execution rate signals is within said predetermined range of values; and (e) modifying the associated set of execution rate signals by a predetermined amount during a predetermined number of instruction execution cycles, and returning to step (c).

17. The method of claim 16, wherein said blocking step (d) includes the step of disabling the counter circuit to prevent modification of the execution cycle count.

18. The method of claim 16, wherein said step (a) is preceded by a programming step wherein the associated set of execution rate signals corresponding to each instruction in the predetermined instruction set is recorded in the storage device.

19. For use in a data processing system having an instruction processor capable of executing a set of machine instructions in an associated predetermined number of execution cycles and further having cone or more peripheral devices for performing input/output operations according to a predetermined input/output execution rate, the instruction processor having decode logic for receiving and decoding the machine instructions and for providing execution control signals for each instruction, the instruction processor further having sequence logic for receiving the execution control signals and for performing the execution of each machine instruction, the execution rate control system comprising:

storage means for selectively storing cycle-slip count signals for each associated machine instruction; and cycle-slip means coupled to said storage means for slipping the execution of a machine instruction in accordance with said cycle-slip count signals when said associated machine instruction is selected for execution.

20. The execution rate control system of claim 19 and further including modification means coupled to said storage means for performing predetermined modifications to said cycle-slip count signals.

21. The execution rate control system of claim 20 wherein said cycle-slip count signals are selected to slip the execution of said associated machine instruction a predetermined amount as compared the predetermined input/output execution rate.

* * * * *